(12) United States Patent
Jakobi et al.

(10) Patent No.: US 6,481,330 B1
(45) Date of Patent: Nov. 19, 2002

(54) ARRANGEMENT FOR ATTACHING A BRAKE FORCE BOOSTER

(75) Inventors: Ralf Jakobi, Flörsheim (DE); Wilfried Wagner, Hüttenberg (DE); Jürgen Faller, Kahl (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/485,482

(22) PCT Filed: Aug. 4, 1998

(86) PCT No.: PCT/EP98/04856

§ 371 (c)(1),
(2), (4) Date: May 29, 2001

(87) PCT Pub. No.: WO99/07590

PCT Pub. Date: Feb. 18, 1999

(30) Foreign Application Priority Data

Aug. 8, 1997 (DE) .......................... 197 34 290

(51) Int. Cl.⁷ ............................................ B60T 13/567
(52) U.S. Cl. ..................................................... 91/376 R
(58) Field of Search ............................. 91/369, 376 R; 92/128

(56) References Cited

U.S. PATENT DOCUMENTS

| | | | | |
|---|---|---|---|---|
| 4,269,533 A | * | 5/1981 | Mashiki et al. | 403/410 |
| 4,433,614 A | * | 2/1984 | Takeuchi et al. | 91/376 R |
| 4,567,728 A | | 2/1986 | Ohmi et al. | |
| 4,592,438 A | * | 6/1986 | Spielmann et al. | 60/533 |
| 4,885,982 A | | 12/1989 | Shimamura | |
| 4,932,275 A | * | 6/1990 | Bischoff et al. | 92/168 |
| 5,082,078 A | | 1/1992 | Umeda et al. | |
| 5,120,106 A | | 6/1992 | Sakurai et al. | |

FOREIGN PATENT DOCUMENTS

| | | |
|---|---|---|
| DE | 32 03 495 | 9/1983 |
| DE | 38 03 958 | 8/1989 |
| DE | 38 22 554 | 1/1990 |
| DE | 39 23 843 | 1/1991 |
| EP | 0 371 831 | 6/1990 |

* cited by examiner

Primary Examiner—Edward K. Look
Assistant Examiner—Igor Kershteyn
(74) Attorney, Agent, or Firm—Rader, Fishman & Grauer PLLC

(57) ABSTRACT

The present invention discloses an arrangement for attaching a brake force booster, that is operable by a push rod, to the splashboard of an automotive vehicle by means of an adapter, wherein a sealing element is interposed between the adapter and the splashboard which additionally is in a radially sealing abutment with the push rod.

In order to ensure the correct positioning of the sealing element during the assembly of the brake force booster, the present invention arranges for the brake force booster to include at least one connecting bolt having attaching elements at its ends for attaching the brake force booster to the adapter and for attaching a master brake cylinder connected downstream of the brake force booster to the booster housing, and the adapter has at least one recess which accommodates the attaching element associated with it, and the sealing element includes at least one guide bush which is adapted to be slipped on the attaching element.

6 Claims, 1 Drawing Sheet

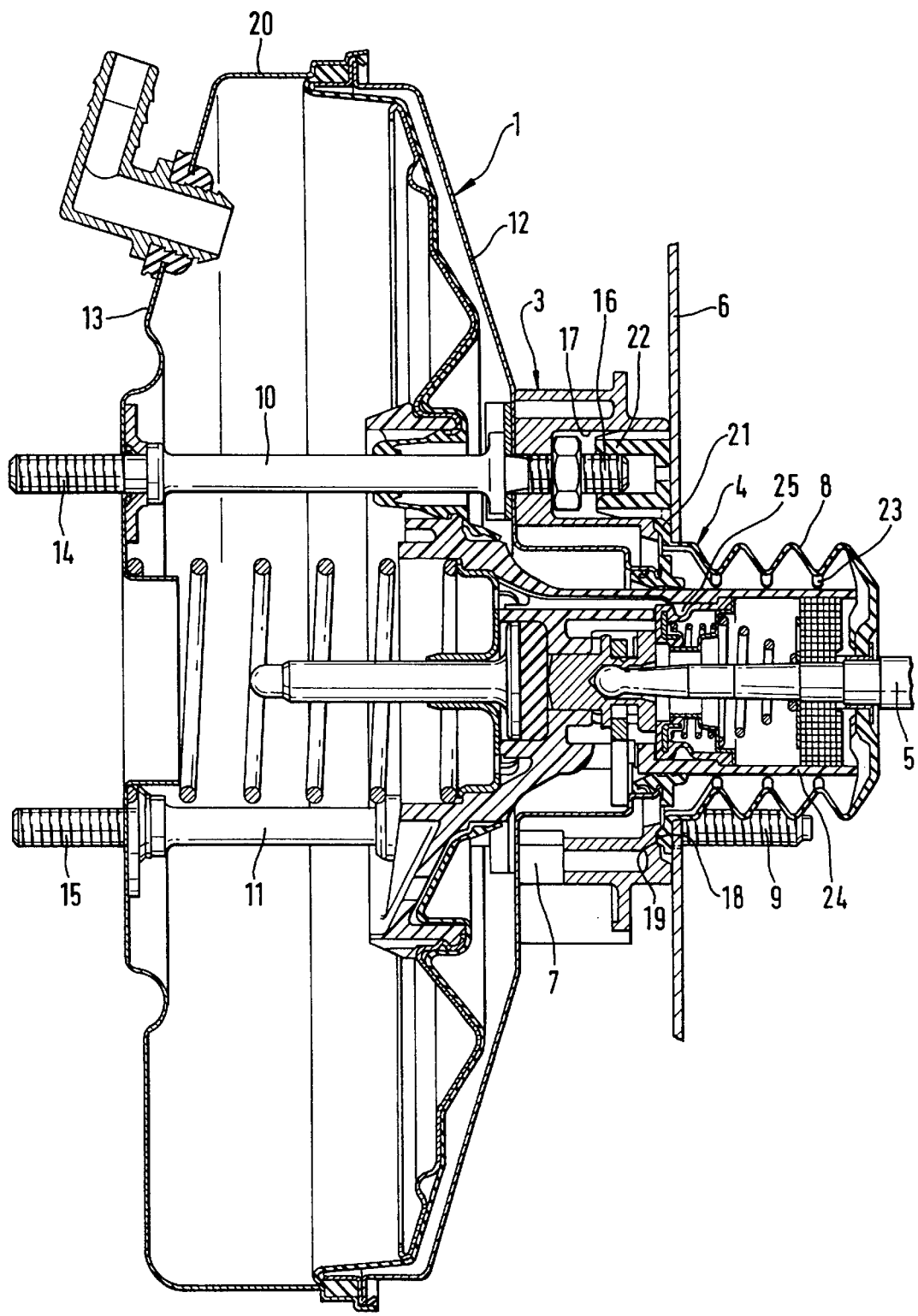

ARRANGEMENT FOR ATTACHING A BRAKE FORCE BOOSTER

TECHNICAL FIELD

The present invention relates to an arrangement for attaching a brake force booster generally relates to brakes and more particularly to the splashboard of an automotive vehicle

BACKGROUND OF THE INVENTION

A fixing arrangement of this general type is disclosed in German patent application No. 38 03 958. The adapter of the prior art fixing arrangement partly encloses the housing of the brake force booster, and the protective cap which is used as a seal has two radial attachment areas which are squeezed in between the adapter and the splashboard after the assembly of the brake force booster. The adapter favorably includes a ventilation passage that permits aspirating the air which is required for a proper functioning of the brake force booster.

However, a disadvantage of the prior art arrangement is the ease in which the protective cap may be lost prior to final assembly thereby impairing the desired sealing effect between the adapter and the splashboard.

An object of the present invention is to disclose an arrangement for attaching a brake force booster which permits an accurate positioning of the sealing element during the assembly and, thus, a reliable sealing of the adapter in relation to the splashboard.

According to the present invention, this object is achieved in that the brake force booster includes at least one connecting pin having at its ends attaching elements for attaching the brake force booster to the adapter and for attaching a master brake cylinder connected downstream of the brake force booster to the booster housing, in that the adapter includes at least one recess which accommodates the attaching element associated with it, and in that the sealing element has at least one guide bush which is adapted to be slipped on the attaching element.

In a preferred aspect of the present invention, the seal is provided as a pleated bellows. This provision permits replacing previously used, properly sealed filter elements disposed in the control housing of the brake force booster for noise damping by simple filter elements which are only used for filtering dust. The result is that the response times of the brake force booster are considerably shortened. The filter elements can favorably be arranged between the part of the booster housing which projects into the inside space of the adapter and the inside wall of the adapter.

Preferably, the pleated bellows has two symmetrically opposite radial attachment areas which cooperate with attaching elements fitted to the adapter. This provision permits effectively retaining the pleated bellows during transport as well as an additional sealing in the area of the attaching elements.

BRIEF DESCRIPTION OF THE DRAWINGS

FIG. 1 shows a longitudinal cross-sectional view of an embodiment of the attaching arrangement of the present invention.

DETAILED DESCRIPTION OF THE PREFERRED EMBODIMENTS

FIG. 1 shows a brake force booster 1 fastened to a splashboard 6 (shown only schematically) of an automotive vehicle splashboard (not shown) by the intermediary of an adapter 3. Brake force booster 1 is fitted to the left-hand side of the adapter, as viewed in the drawing. The adapter 3 which includes a ventilation passage 7 has two oppositely arranged screw bolts on its side close to the splashboard 6 which pass through correspondingly configured openings in the splashboard 6 and cooperate with screw nuts (not shown). The screw bolt 9 shown in the drawing is designated by reference numeral 9. The ventilation passage 7 which permits a quick ventilation of the brake force booster 1 is formed by a radial recess in the adapter wall in this embodiment. Interposed between the splashboard 6 and the adapter 3 is a seal 4 which is configured as a pleated bellows 8 in the embodiment shown. A push rod 5 is passed through the end of the pleated bellows 8 remote from the adapter 3. Coupled to a (non-illustrated) brake pedal, push rod 5 is used to actuate the brake force booster 1. Further, the pleated bellows 8 includes in its interior several radial knubs 23 or webs which bear against a control housing 24 that receives a control valve 25 of the brake force booster 1.

To attach the brake force booster 1 to the adapter 3, two rod-shaped connecting pins 10, 11 are used which are arranged in parallel to the longitudinal axis of the brake force booster so that they interconnect housing halves 12, 13 that form a booster housing 20. On the ends of the connecting pins 10, 11, illustrated on the left in the drawing, first attaching elements 14, 15 are provided, the purpose of which is to attach a master brake cylinder (not shown) that is connected downstream of the brake force booster 1. On the ends of the connecting pins 10, 11 shown on the right hand in the drawing, second attaching elements 16 are provided which serve for the attachment of the booster housing 20 on the adapter 3 and are received in cylindrical recesses 17,—in the adapter 3.

Further, the pleated bellows 8 has a radial collar 21 at its end close to the adapter 3. The side of collar 21 remote from the splashboard 6 has an annular bead 18 which is received in an annular groove 19 provided in the adapter. Projecting from collar 21 are two radially oppositely arranged attaching lugs (not shown) which include openings for the screw bolts 9, to pass through. Also, guide bushings 22 which extend axially in the direction of the brake force booster 1 are formed on the periphery of the collar 18 in a manner preferably offset by 90° in relation to the attaching lugs. The outside diameter of guide bushings 22 corresponds to the diameter of the above-mentioned recesses 18. In the assembled condition of the brake force booster 1, bushings 22 are slipped on attaching elements 16, associated with the adapter 3.

What is claimed is:

1. System for attaching a brake force booster, that is operable by a push rod, to a splashboard of an automotive vehicle, comprising:

an adapter, a sealing element interposed between the adapter and the splashboard which said sealing element including an opening is in a radially sealing abutment with the push rod, at least one attaching element for attaching the brake force booster to the adapter wherein the adapter includes a mating recess for accommodating the attaching element, wherein the sealing element has at least one guide bush which is adapted to be slipped on the attaching element.

2. Arrangement as claimed in claim 1, wherein the attaching element is arranged on a first end of a connecting pin and attaches the brake force booster to the adapter, wherein the connecting pin has a second end for attaching a master brake cylinder to a booster housing.

3. Arrangement as claimed in claim 1, wherein the sealing element further includes a pleated bellows, and the guide bush arranged in a radial fringe area or a collar thereof.

4. Arrangement as claimed in claim 3, wherein the pleated bellows has a radially circumferential annular bead which is adapted to be placed into a radially circumferential annular groove of the adapter.

5. Arrangement as claimed in claim 1, wherein the pleated bellows has two oppositely arranged radial attaching lugs which cooperate with attaching elements or screw bolts fitted to the adapter.

6. Arrangement as claimed in claim 5, wherein the pleated bellows has in its interior a plurality of radial knubs or webs which bear against a control housing that accommodates a control valve of the brake force booster.

* * * * *